Figure 1:
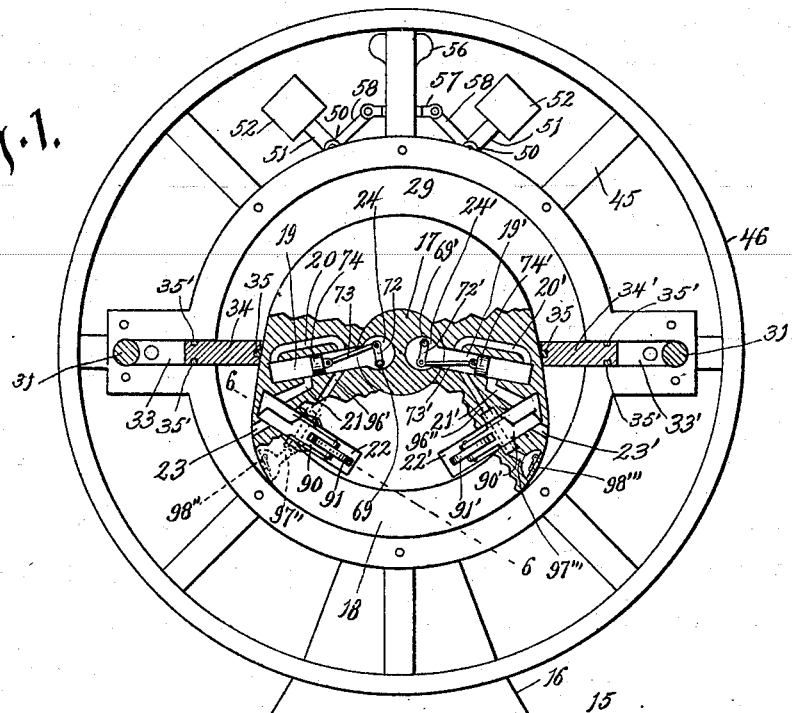

No. 624,462. Patented May 9, 1899.
J. P. DORAN.
ROTARY ENGINE.
(Application filed Mar. 10, 1898.)

(No Model.) 5 Sheets—Sheet 1.

Witnesses. Inventor.
John P. Doran
By Benedict and Morsell
Attorneys.

No. 624,462. Patented May 9, 1899.
J. P. DORAN.
ROTARY ENGINE.
(Application filed Mar. 10, 1898.)
(No Model.) 5 Sheets—Sheet 2.

Witnesses.
H. Keeney
Anna P. Faust

Inventor.
John P. Doran
By Benedict and Morsell
Attorneys.

THE NORRIS PETERS CO., PHOTO-LITHO., WASHINGTON, D. C.

No. 624,462.  
J. P. DORAN.  
ROTARY ENGINE.  
(Application filed Mar. 10, 1898.)  
(No Model.)  
Patented May 9, 1899.  
5 Sheets—Sheet 3.
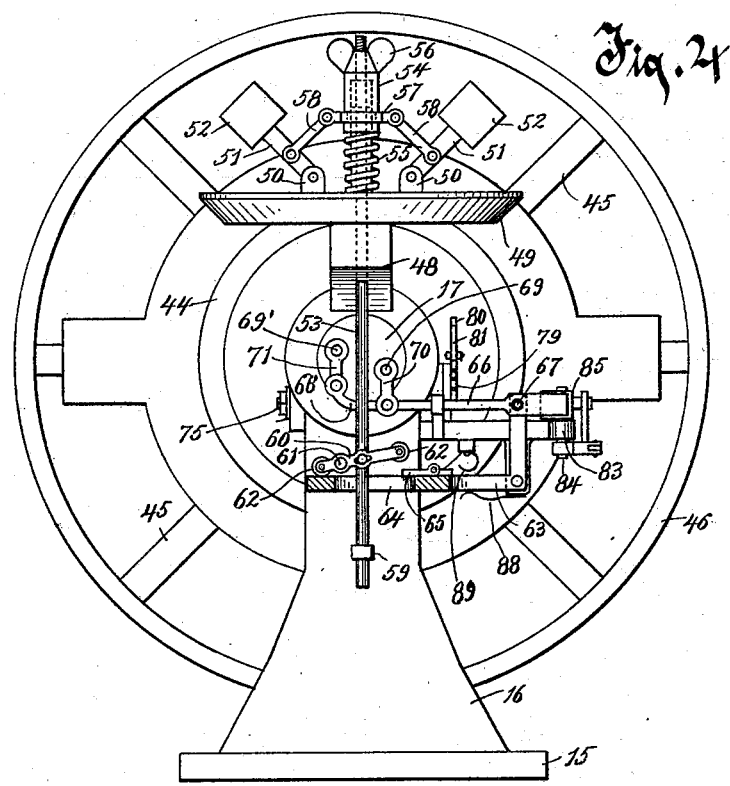
Fig. 24.
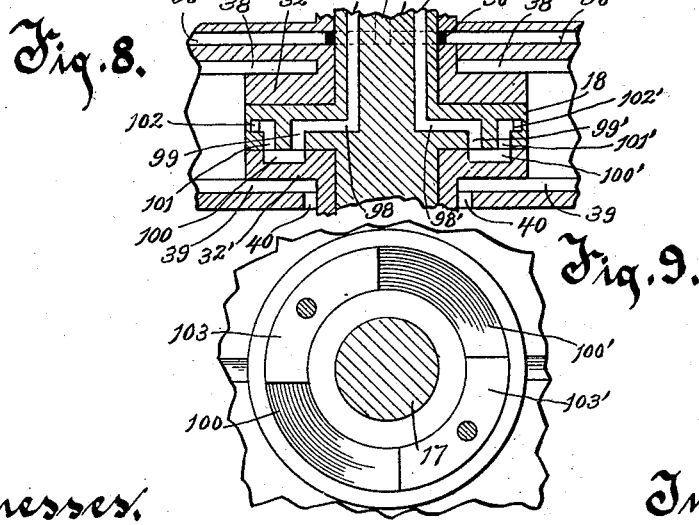
Fig. 8.  
Fig. 9.
Witnesses.  
Inventor.  
John P. Doran  
By Benedict and Morsell  
Attorneys.

No. 624,462. Patented May 9, 1899.
J. P. DORAN.
ROTARY ENGINE.
(Application filed Mar. 10, 1898.)
(No Model.) 5 Sheets—Sheet 4.
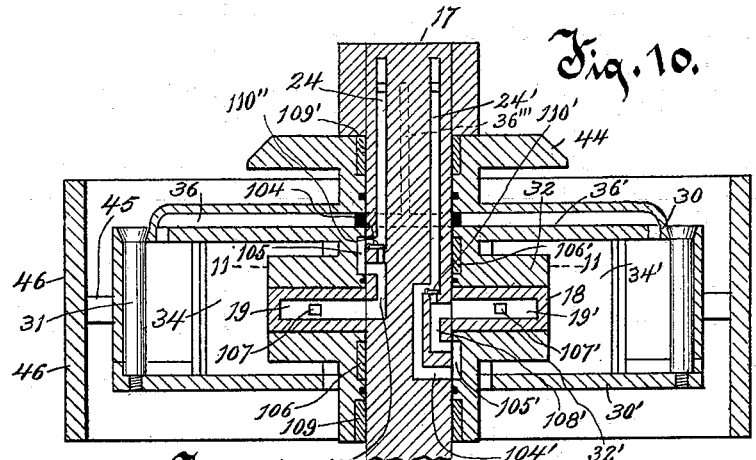
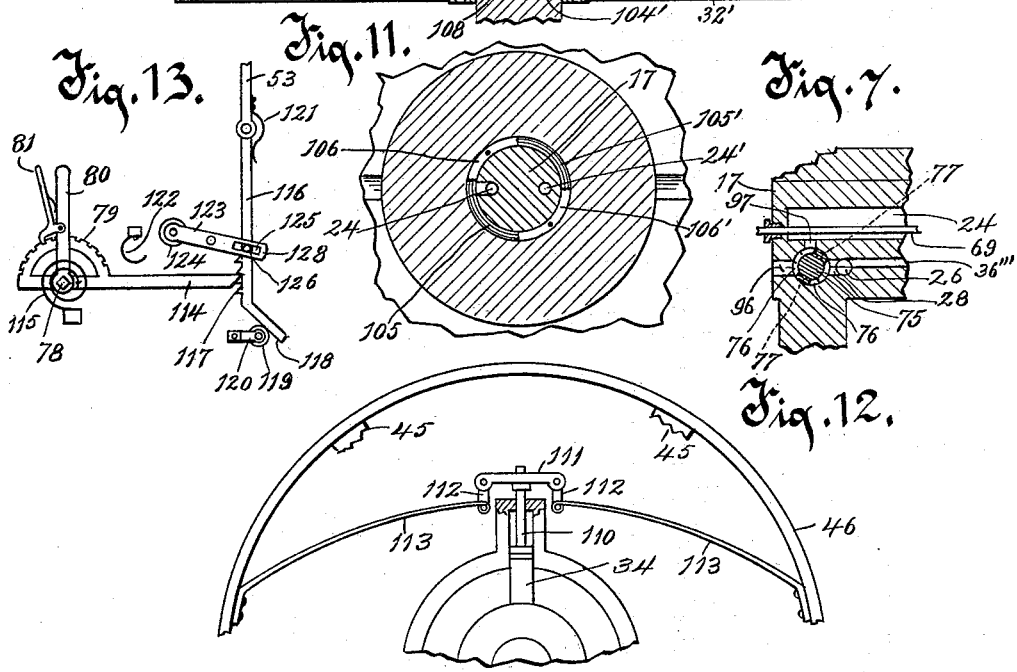
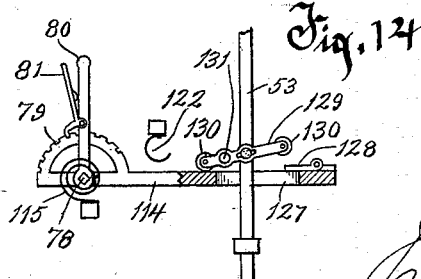
Witnesses. Inventor.
John P. Doran
By Benedict and Morsell
Attorneys.

No. 624,462. Patented May 9, 1899.
J. P. DORAN.
ROTARY ENGINE.
(Application filed Mar. 10, 1898.)
(No Model.) 5 Sheets—Sheet 5.

Witnesses. Inventor.
John P. Doran
By Benedict & Morsell
Attorneys.

UNITED STATES PATENT OFFICE.

JOHN P. DORAN, OF LARK, WISCONSIN.

ROTARY ENGINE.

SPECIFICATION forming part of Letters Patent No. 624,462, dated May 9, 1899.

Application filed March 10, 1898. Serial No. 673,289. (No model.)

*To all whom it may concern:*

Be it known that I, JOHN P. DORAN, of Lark, in the county of Brown and State of Wisconsin, have invented a new and useful Improvement in Rotary Engines, of which the following is a description, reference being had to the accompanying drawings, which are a part of this specification.

My invention has relation to improvements in rotary engines.

The primary object had in view is to provide a construction wherein means are employed for cutting off at intervals the supply of live steam to the casing, so that at certain periods the engine is run by the expansive force of the steam already in the casing and at certain other periods by the direct force of the incoming steam.

A further object resides in providing an improved means for tripping the governor mechanism, whereby when the speed of the engine becomes too fast the quantity of steam admitted to the casing is decreased, or if the speed exceeds a certain limit then the steam is entirely cut off.

A still further object contemplated is the provision of a construction in which a stationary piston is employed having a revolving part thereround forming the interior chamber in which the piston is located, said revolving part provided with a series of radiating spokes, to which an outer rim is attached, forming a wheel-periphery, and around which periphery a belt for transmitting the power may be passed. It would not of course be practicable to pass the belt directly around the casing forming the casing-chamber, as the heat within the chamber would have the effect of injuring the belt in a very short time. By providing the radiating spokes and the outer connecting-rim, however, and passing the belt around said outer rim the belt is protected against any injurious effects from the heat.

With the above and other incidental objects in view the invention consists of the devices and parts or their equivalents, as hereinafter more fully set forth.

Figure 2:
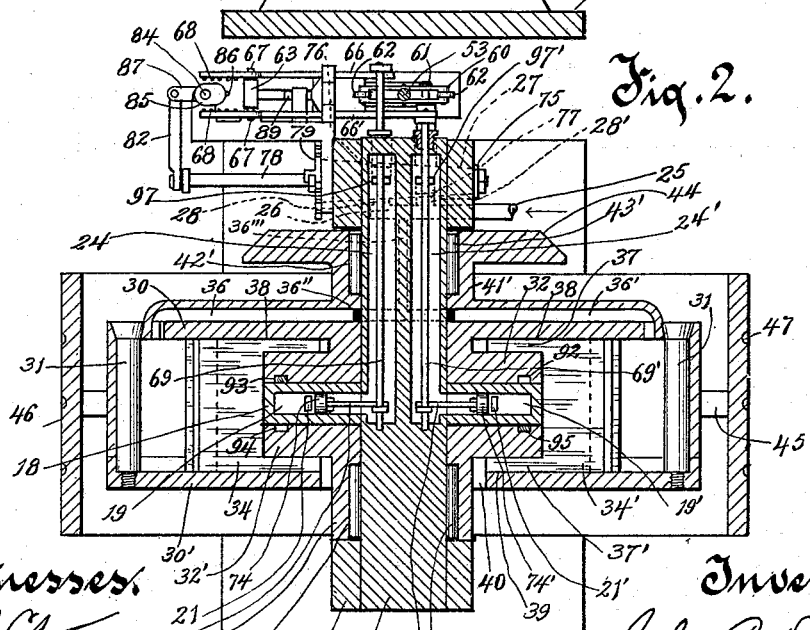
Figure 3:
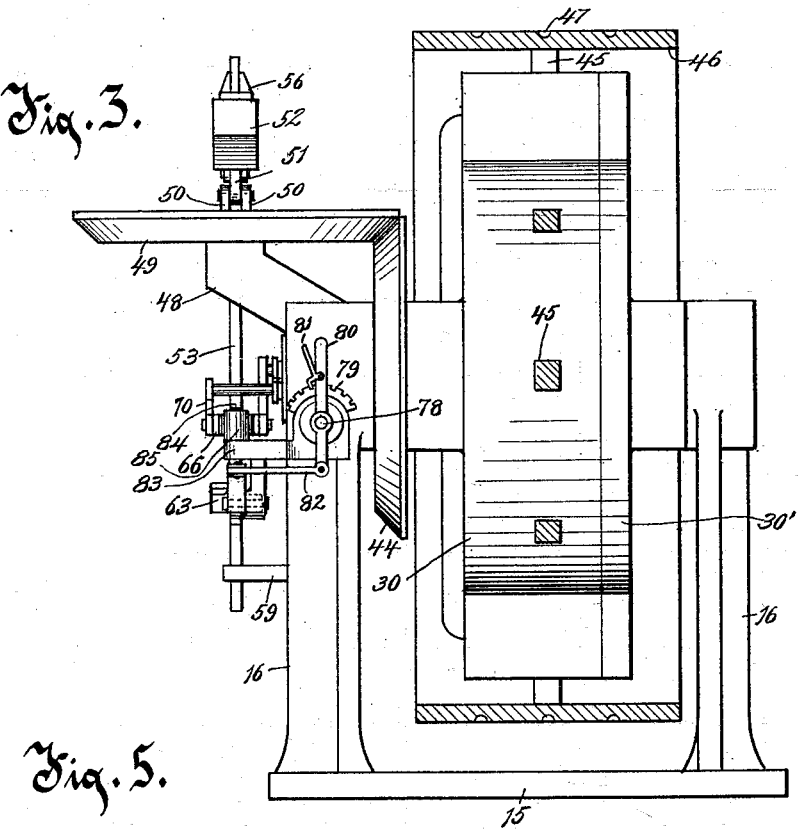
Figure 5:
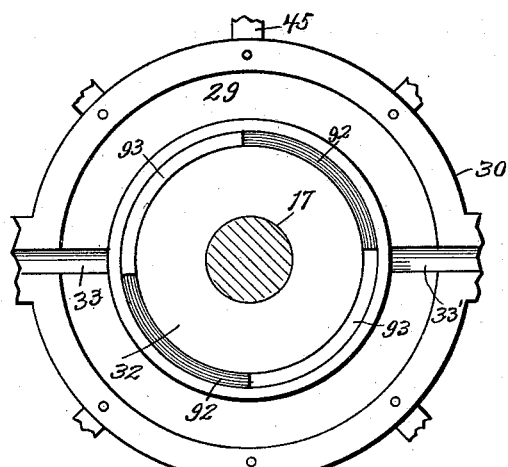
Figure 6:
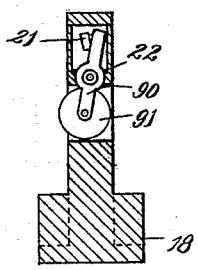
Figure 15:
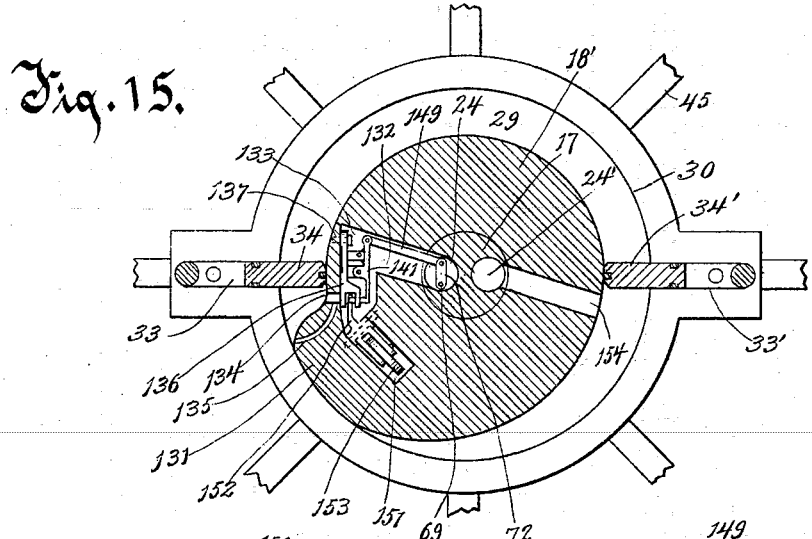
Figure 16:
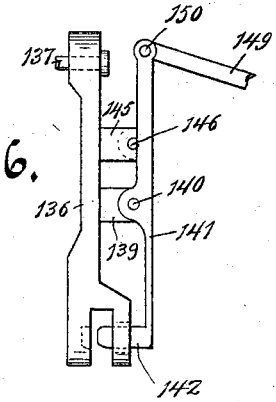
Figure 17:
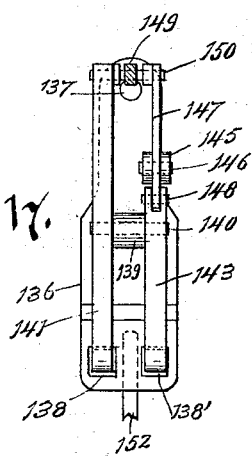
Figure 18:
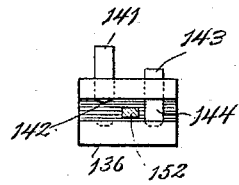

In the accompanying drawings, Figure 1 is a front elevation of a rotary engine embodying one form of my improvements, showing one side of the casing removed and certain parts broken away. Fig. 2 is a horizontal sectional view of Fig. 1. Fig. 3 is an end elevation with the outer rim in section. Fig. 4 is a rear elevation, parts broken away. Fig. 5 is a view of the casing with the piston removed. Fig. 6 is a cross-section on the line 6 6 of Fig. 1. Fig. 7 is a view of the valve and allied parts used in the several forms of construction. Fig. 8 is a fragmentary view of a modified form, being a section on the same plane as Fig. 2. Fig. 9 is a view of the front side of the casing of Fig. 8. Fig. 10 is a horizontal section of a modified form. Fig. 11 is a detail of Fig. 10. Fig. 12 is a modified form of slide-gate-controlling device. Fig. 13 is a modified form of governor mechanism for controlling the valve. Fig. 14 is another modification of the governor mechanism for controlling the valve. Fig. 15 represents the casing with one side removed and the piston and other parts in section. Fig. 16 is a detail view of the valve mechanism relating to this modification. Fig. 17 is a view at right angles to Fig. 16, and Fig. 18 is a front view of Fig. 17.

Referring to the drawings, the numeral 15 indicates a suitable base having standards or uprights 16 16, extending upwardly therefrom. In the upper ends of these uprights are mounted fast the opposite ends of a fixed axis 17, which is formed or provided medially with a fixed piston 18, said piston being provided with two chambers 19 19'. Each chamber has extending from one point thereof to another a channel. The channel of the chamber 19 is indicated by the numeral 20 and the channel of the chamber 19' by the numeral 20'. The chamber 19 has extending therefrom a duct 21 and chamber 19' a duct 21'. These ducts respectively lead to chambers 22 22', which are formed in the piston, and from these chambers said ducts are extended through the edge of the piston, as indicated by the numerals 23 23'.

The fixed shaft or axis 17 is formed with two parallel longitudinal channels 24 24', which at their inner ends communicate with the chambers 19 19', respectively. The numeral 25 indicates a steam-inlet pipe, which leads from any suitable source of steam-supply. This pipe communicates with a passage 26, which extends across the fixed shaft or axis 17, beneath the longitudinal channels 24 24'. The passage 26 communicates with a transverse valve-opening 27 at the points 28 28'.

Mounted revolubly on the shaft or axis 17 is a casing, which forms an interior chamber 29, in which the piston is located. This casing is preferably constructed of two sections, (designated, respectively, by the numerals 30 30'.) The section 30 forms one side piece and the greater portion of the circumferential rim of the casing and section 30' the opposite side piece and a small portion of the rim of the casing, as most clearly shown in Fig. 2. The two sections are detachably held together by means of screw-bolts 31. The inner sides of the side pieces of the sections 30 30' are extended inwardly and thickened, as indicated, respectively, by 32 32', said inwardly-extended or thickened portions bearing closely against the sides of the piston, but not close enough to prevent the rotation of the casing. These inwardly-projecting portions conform to the contour of the piston.

At diametrically opposite points the casing is extended outwardly to provide lateral passages 33 33'. In these passages are adapted to work reciprocating gates 34 34', the inner ends of which extend into the chamber 29 and are adapted to bear against opposite points of the edge of the piston. Each gate is formed at its inner end with a recess, in which a suitable packing 35 is disposed in order to form a steam-tight connection between the end of the gate and the edge of the piston. Near the outer end of each gate, on the top and bottom surfaces thereof, are also formed recesses, in which are disposed suitable packings 35' 35' in order to provide a steam-tight connection between the top and bottom surfaces of the gates and the adjacent walls of the passages 33 33'. These lateral passages 33 33' have extending therefrom longitudinal channels 36 36', said longitudinal channels communicating with an annular channel 36'', which annular channel in turn communicates with a longitudinal channel 36''' in the shaft or axis 17, said longitudinal channel in turn communicating with the main steam-passage 26. The inner edge of each gate is formed at opposite ends of said edge with inwardly-extending arms 37 37'. The arm 37 of each gate fits in a recess 38, formed in the inwardly-extending thickened portion 32 of section 30 of the casing, and the arm 37' of each gate fits in a recess 39, formed in the inwardly-extending thickened portion 32' of the section 30' of the casing. Each recess 39 is in communication with the external atmosphere by means of an opening 40.

The sides of the casing are formed, respectively, with outwardly-extending hub portions 41 41', which surround the shaft or axis. These hub portions are formed, respectively, with recesses 42 42', in which are arranged antifriction-rollers 43 43', which bear directly against the shaft or axis, and thereby serve to reduce friction to the minimum. The outer end of the hub 41' is provided with a beveled gear 44, preferably forming an integral part of said hub.

The periphery of the casing has radiating therefrom a series of spokes 45, which extend to and connect with an outer rim 46. This outer rim forms the band or pulley for a belt (not shown) for transmitting the power of the engine to the mechanism to be operated. The outer surface of this rim is advisably provided with a series of recesses 47. These recesses when the belt is adjusted around the rim form air-chambers, and thereby assist in holding the belt by suction to the surface of the rim. They also form cooling-chambers in order to counteract the effect of any heat on the belt which may be transmitted through the spokes. It will be evident that the radiating spokes 45 and the connecting outer peripheral rim 46 possess a distinct advantage. For instance, it would be impracticable to pass the belt directly around the periphery of the casing, as the heat within the casing would have the effect of injuring the belt in a very short time. By providing the radiating spokes and the outer connecting-rim, however, and passing the belt around said outer rim the belt is thereby almost entirely protected against any injurious effects from the heat.

Extending upwardly from one of the standards 17 is an arm 48. This arm revolubly supports a bevel-gear 49, which gear is in mesh with the bevel-gear 44. Extending upwardly from the upper side of the bevel-gear 49 are lugs or ears 50, to which are pivoted governor-arms 51 51, which arms carry at their outer ends governor-weights 52 52. Passing through the bevel-gear 49 and through the arm 48 is a rod 53. This rod has mounted thereon near its upper end a sleeve 54. Encircling the rod, between the sleeve and the upper side of the bevel-gear 49, is a coiled spring 55. The upper extremity of the rod is threaded to receive a wing-nut 56, which nut when turned in one direction is adapted to increase the tension of the coiled spring and when turned in the opposite direction is adapted to decrease the tension of said spring. The sleeve, near its lower end, is formed with an annular groove, in which is seated a ring 57, which ring is provided with laterally-projecting lugs, to which are pivoted the ends of links 58 58, the opposite ends of said links being pivoted to the governor-arms 51. The lower end of the rod 53 works through a guide formed by an apertured lug 59, projecting from one of the uprights 17. Below the arm 48 the rod has pivoted thereto a lever 60. This lever is also pivoted at the point 61 to the upright 17. The opposite ends of this lever have preferably journaled therein antifriction-rollers 62 62. Pivoted to the framework is a bell-crank lever 63. The horizontal arm of this lever is provided with an elongated slot 64, through which slot the rod 53 passes. The lever 60, which is pivoted to the rod and also to the upright, is arranged just above the horizontal arm of the bell-crank lever. Said horizontal arm of the bell-crank lever has pivoted thereto a plate or leaf 65, which projects at one end for a short distance over the slot. The vertical member of the bell-crank extends upwardly between two arms 66 66', the upper extremity of the vertical member being somewhat enlarged, as shown clearly in Fig. 2, and from opposite ends of this enlargement project trunnions 67 67, which trunnions pass freely through openings formed in the arms 66 66'. The outer ends of the arms 66 66' are somewhat widened, and upon the inner faces of these widened portions are formed teeth 68. Extending through the longitudinal channels 24 24' of the fixed shaft or axis are rods 69 69'. The inner ends of these rods turn in suitable bearings at the inner ends of the respective channels, and the outer ends of the rods extend through the outer end of the shaft or axis. Rod 69 is extended outwardly somewhat farther than rod 69', and said rod 69 has connected to its outer extremity a link 70, the opposite end of said link being connected to the arm 66. The outer end of rod 69' has connected thereto a link 71, and the opposite end of this link is connected to the inner arm 66'. Near their inner extremities the rods 69 and 69' have connected thereto, respectively, links 72 72', and the opposite ends of said links have connected thereto, respectively, valve-rods 73 73', which valve-rods extend at right angles to the rods 69 69' into the chambers 19 19' of the piston, the ends of said valve-rods within the said chambers 19 19' being connected, respectively, to valves 74 74'.

The main valve is indicated by the numeral 75, and this valve is advisably of conical form and fits in the valve-opening 27, which opening intersects the outer end of the fixed shaft 17. The valve, at points corresponding to the location of the channels 24 24' of the shaft, is cut away at diametrically opposite points to form segmental recesses. Two of said segmental recesses are indicated by the numerals 76 76 and the other two segmental recesses by the numerals 77 77. (See particularly Figs. 2 and 7.) This valve has projecting therefrom a valve-stem 78, and mounted loose on this valve-stem, but fast to the framework, is a segmental rack 79. Mounted fast on the valve-stem is a lever 80, which lever has pivoted thereto a dog or pawl 81, which dog or pawl when in engagement with the teeth of the segmental rack 79 holds the lever, and consequently the valve, to adjusted position. Connected to the lower end of the lever 80 is a rod 82. Journaled in a suitable bearing 83 is a short upright shaft 84, said shaft carrying at its upper end a cam 85, which is fast thereon, the inner end of said cam being provided with a tooth 86. As will be seen more particularly from Fig. 2, this cam is arranged between the outer ends of the arms 66 66'. The rod 82, which is connected at one end to the valve-stem 78, has connected to its opposite end a short link 87, the opposite end of said link being connected rigidly to the short shaft 84.

The horizontal member of the bell-crank lever 63 is normally supported in a horizontal position by means of a spring 88. Another spring 89 is located above said horizontal arm of the lever and limits the upward swinging of the horizontal member.

Within the recesses 22 22' of the piston are pivoted arms 90 90'. The lower ends of said arms carry rollers 91 91', working in suitable openings for their accommodation, and the upper ends of the arms serve as valves to regulate, respectively, the ducts 21 21'. The inwardly-extending thickened portion 32 of the section 30 of the casing is formed at diametrically opposite points with depressions 92 92 and at other diametrically opposite points with raised surfaces 93 93. The inwardly-extending thickened portion 32' of the section 30 of the casing is also formed at diametrically opposite points with similar depressions 94 94 and at other diametrically opposite points with raised surfaces 95 95. This construction is shown most clearly in Figs. 2 and 5.

The operation of the form of engine shown in Figs. 1 to 7, inclusive, will now be explained. In the position of the valve-stem lever shown in Fig. 3 the valve 75 is in such position that its diametrically opposite recesses 76 76 and 77 77 will not permit inlet-steam to enter the chamber 29 nor to be exhausted therefrom. The machine is therefore represented as at a standstill. The Fig. 7 representation, however, shows the valve 75 as having been turned so as to bring one of its recesses 76 into register with the exhaust-opening 96 and also in register with a port 97, leading to the passage 24, and one of the recesses 77 of the valve in register with the port 28', leading from the steam-inlet passage 26, so that the inlet-steam is free to flow through said port 28' into said recess 77 of the valve, and thence through a port 97' into passage 24'. The exhaust-steam, on the other hand, is free to flow outwardly through passage 24, thence through port 97 into one of the recesses 76, and thence out through exhaust-opening 96. The inlet-steam, flowing inwardly through passage 24', enters the chamber 19' of the piston and from said chamber passes into the passage 20', which conducts the steam to the outer end of the chamber 19', and from said outer end of said chamber the steam enters the duct 21'. If the upper end of arm 22' is turned to such position as to uncover the duct 21', the steam is permitted to continue its course through duct 23' and enter the chamber 29 in that portion of said chamber between the under side of the sliding gate 34' and the eccentrically-projecting portion of the piston which contacts with the inner circular wall of the chamber. As the piston is stationary, the force of the steam in the space referred to will cause a rotation of the casing and the rim 46 connected thereto in a direction toward the left of Fig. 1. Steam is also free to pass from passage 26 into channel 36''', thence into annular passage 36'', and thence through channels 36 36' into the passages 33 33', so as to act against the outer edges of the gates 34 34' in order to thereby hold the inner edges of said gates firmly against the piston. It will be noticed that the outer edges of both gates 34' and 34 are longer than the inner edges thereof, as will be clearly seen from Fig. 2, inasmuch as said inner edges are provided with projecting arms 37 37', the arms 37' passing outwardly and being exposed to the external atmosphere through the openings 40 40. This excess in length of the outer edges of the gates will cause the steam acting thereagainst to force the gates inwardly against the force of the steam acting against the shorter inner edges of the gates. As the casing continues to rotate in the manner just explained the space between the under side of the gate 34' and the eccentric portion of the piston is continually enlarged. It will also be understood that in this movement of the casing the raised segmental surface 95 is acting against the roller 91', the opposite edge of said roller being received in the opposite segmental recess 92, so that the upper end of the arm 90' is swung and held in a position to open duct 21'. When the casing has revolved sufficiently far to bring the raised cam-surface 95 out of contact with roller 91', said roller will then be acted upon by one of the raised surfaces 93 and the arm 90' turned in an opposite direction, so as to close the duct 21', the opposite edge of the roller being received in one of the recesses 94. This will have the effect of closing off the flow of inlet-steam into the casing, and hence further rotation of the casing will be caused entirely by the expansive force of the steam already in the chamber 29. It will therefore be seen that throughout the rotation of the casing there are periods when the casing is rotated by the inflowing steam and also periods when the inflowing steam is cut off and the casing rotated by the expansive force of the steam already in the chamber of the casing, whereby a saving is effected in the consumption of steam. It will further be understood that the raised surfaces 95 on one side also act alternately on the arm 90 so as to open the duct 21 to permit the exhaust-steam to pass into the chamber 19 of the piston, thence through the passage 20 into the inner end of said chamber, thence through the longitudinal channel 24 of the shaft, and out through the final exhaust 96, hereinbefore referred to, and it will further be understood that when the raised surfaces 95 are not acting on the arm 90 one or the other of the raised surfaces 93 will be acting thereon, so as to throw said arm in position to close off the exhaust-duct 21. The duct 21 therefore is intermittently opened and closed the same as the inlet-duct is intermittently opened and closed. In order to provide for a continuous exhaust, however, no matter in which direction the engine is running, I run from each chamber 19 19' extra ducts, the duct leading from chamber 19 being indicated by the numeral 96' and the duct from the chamber 19' by the numeral 96''. These ducts lead, respectively, to the tubular pivots of the arms 90 90', and other ducts 97'' 97''' lead from the opposite ends of the tubular pivots to the casing-chamber 29. These ducts, near their outer ends, are enlarged to form valve-chambers in which inwardly-opening flap-valves 98'' 98''' are respectively pivoted. From this arrangement it will be obvious that when the inlet-steam is flowing through the channel 24' into one portion of the casing-chamber 29 there is a continuous exhaust from another portion of said casing-chamber through duct 97'', through the tubular pivot of arm 90, thence through duct 96' into chamber 19, thence through channel 24, and out through final exhaust 96, and when the engine is running in the opposite direction a continuous exhaust occurs through duct 97''', tubular pivot of arm 90', thence through duct 96'' into chamber 19', along channel 24' to final exhaust.

It will be obvious that in order to secure a reversal of the operation of the engine all that is necessary to be done is to shift the valve-operating lever 80 so as to reverse the positions of the recesses 76 76 and 77 77 of the main valve 75. The inlet will then be along the passage 26, through the duct 28 into one of the recesses 77 of the valve, thence through the duct 97 into the passage 24. The exhaust, on the other hand, will be from the passage 24' through duct 97' into one of the recesses 76 of the valve and out through the exhaust 96. Of course the passage of the steam through the stationary shaft or axis and into the chamber 29 and its exhaust from said chamber and through the shaft or axis will be the same as that already described, excepting that those passages through which the inlet-steam before passed will become the exhaust-passages, and, vice versa, the former exhaust-passages will become the inlet-passages.

In order to initially start the engine, all that is necessary to be done is to turn the lever 80 on its pivot in the proper direction to bring either set of the recesses of the valve into register, respectively, with the inlet and exhaust ports hereinbefore explained. This movement of the lever 80 also effects another function, viz: It throws one or the other of the arms 66 or 66', in accordance with which way the lever is thrown, out of engagement with the bell-crank lever 63, so that the governor-trip mechanism will only act on the particular arm 66 or 66' with which the bell-crank lever is still in engagement, said arm, through the connection between the same and the valve 74 or 74', being adapted to control the speed of the engine by regulating the quantity of inlet-steam through the medium of the governor-trip mechanism. The throwing of either arm 66 or 66' out of engagement with the bell-crank lever is effected in the following manner, viz: When the lever 80 is turned in the manner pointed out, it will have the effect of moving the link 82, which link in turn will act on the short link 87 and cause a turning of the shaft 84. As this shaft 84 carries rigidly at its upper end the cam 85, said cam will be turned so as to throw its tooth into engagement with the teeth of either of the arms 66 or 66'. If, for illustration, it be supposed that the cam is turned in a direction to throw the tooth 86 into engagement with the teeth 68 of the arm 66, the outer end of said arm will be thrown out laterally, it being understood that both of said arms are of spring material, so as to permit them to be thus sprung outwardly. As the arm 66 is sprung outwardly, as thus explained, it will bring its opening out of engagement with the trunnion 67.

The automatic cut-off of the steam through the medium of the governor mechanism will now be explained. If the speed of the engine becomes too great, the governor-weights will of course fly outwardly by centrifugal force. This will cause a gradual down movement of the sleeve 54 against the action of the coiled spring 55. The sleeve will carry downwardly with it the rod 53, which rod in turn will cause a turning of the lever 60 on its pivot 61, so as to throw the right-hand end, Fig. 4, of said lever down on top of the lid 65. This will cause a turning of the bell-crank lever on its pivot and a downward movement of its horizontal arm. This will permit the right-hand end of lever 60 to roll by the end of the pivoted lid and pass into the elongated slot 64 of the horizontal member of the bell-crank lever. It will of course be understood that during this operation either one or the other of the arms 66 or 66' is out of engagement with its trunnions 67, projecting laterally from the upper end of the vertical member of the bell-crank lever, as previously explained. It follows, therefore, that with the downturning of the horizontal member of the bell-crank lever just described either the arm 66 or 66', which is still in engagement with the bell-crank lever, is moved longitudinally, and consequently either the valve 74 or 74', through the described connections, is pushed outwardly to partially cover or entirely cover the duct leading to the chamber 29. It will of course be understood that the moment the right-hand end of the lever 60 passes into the slot 64, as just described, the horizontal member of the bell-crank lever is free to turn upwardly, and the spring 89 is provided as a cushion to relieve shock or prevent the horizontal arm of the lever coming into contact with the pivot 61. Of course the effect of the valve 74 or 74' moving toward the inlet-duct leading to the chamber 29 is to slow up the speed of the engine, and as said speed is thus gradually reduced the coiled spring 55 will overcome the weights 52 and tend to again raise the sleeve 54, and consequently the rod 53. As the rod 53 rises it carries upwardly with it the lever 60. The upward movement of this lever 60 is not interfered with by the lid 65, as said lid is hinged so as to swing upwardly. After the rod 53 is raised back to the position shown in Fig. 4 the lever 60 will be turned back to its Fig. 4 position, and the left-hand end of said lever bearing on the horizontal member of the bell-crank lever will cause said horizontal member to be held at the horizontal position shown in Fig. 4.

In the illustration given the arm 66' is left in engagement with the bell-crank lever 63. When, therefore, the rod 53 is moved downwardly by the outflying of the governor-weights and the bell-crank lever is turned in the manner described, the arm 66' is moved longitudinally. This will have the effect of turning link 71, which in turn will rotate rod 69', and said rod will actuate the link 72' at the inner end thereof and cause a movement of the valve-rod 73' and its valve 74' outwardly, so as to partially or completely close the duct 21' for the inlet-steam.

The lever 80, which is fast on the valve-stem of the valve 75, in connection with the dog 81, not only provides a means for reversing the engine by turning the valve 75 so as to reverse the position of the recesses of said valve, but also for entirely cutting off the flow of inlet-steam which enters through the pipe 25. When the lever 80 is turned to the vertical position (shown in Fig. 3) and the dog 81 permitted to engage the segmental rack, the valve 75 is turned and held, so as to entirely cut off the entrance of inlet-steam into the engine.

In Fig. 8 of the drawings I show a modified form of construction in which the governor-tripping mechanism is entirely dispensed with. In this form the passages 24 24' are provided in the fixed shaft or axis, and these passages connect at their inner ends with branch passages 98 98', extending into the piston. These branch passages in turn are also provided with branch passages 99 99', respectively, leading therefrom at right angles and laterally through a corresponding side of the piston. These latter passages 99 99' register with recesses 100 100', formed in the thickened inwardly-extending portion 32' of the side piece of the casing. These recesses 100 100' respectively connect the passages 99 99' with other passages 101 101' in the piston. These passages 101 101' communicate, respectively, with the casing-chamber 29 by means of ports 102 102'. It will be understood that the recesses 100 100' are struck in the arc of a circle and form only segments of a complete circle, as clearly shown in Fig. 9. The remaining portions of the circle are formed by raised curved segmental surfaces 103 103'. (See Fig. 9.) In the operation of this form of device if the engine is taking inlet-steam through the passage 24 said steam will pass through said passage and enter the branch passages 98 and 99, and during the revolution of the casing, as the recesses 100 100' are brought into register with the passages 99 and 101, said recesses will permit the inlet-steam to pass into the passage 101 and thence out through the port 102 to thereby enter the chamber 29 and rotate the piston by the force of the inflowing steam, while, on the other hand, the recesses 100 100' will permit the exhaust-steam which is free to enter the port 102' and passage 101' to pass by way of passages 99' and 98' into the longitudinal passage 24' of the fixed shaft or axis. When, however, the raised surfaces come into register with the passages 101 and 99 and with the passages 101' and 99', the inlet-steam is cut off to the piston-chamber 29 and the exhaust-steam from said chamber. During the time the inlet-steam is thus cut off, therefore, the casing is being rotated entirely by the expansive force of the steam already in the piston-chamber 29. When inlet-steam passes through passage 24', of course the reverse operation takes place. It will be noticed that in this form of construction the passages 36 36' for conducting the steam back of the sliding gates are provided the same as in the principal form of construction.

Fig. 10 of the drawings shows another modified form of the device, in which also the governor-tripping mechanism may, although not necessarily, be entirely omitted. In this form the fixed shaft or axis 17 is likewise provided with the longitudinal passages 24 24'. These passages, however, instead of having branches similar to 98 98' of Fig. 8 extending longitudinally into the piston, are provided with lateral ducts 104 104', extending through opposite points of the shaft or axis and communicating, respectively, with segmental recesses 105 105', which are arranged in the circular edges of the casing which border the central opening of said casing instead of being arranged on the inner side of one of the side pieces of the casing, as in the Fig. 8 form of construction. The circle of which these segmental recesses form a part is completed by segmental raised surfaces 106 106'. (See Fig. 11.) In this form of construction the piston is provided with chambers 19 19', the same as in the principal form of construction, and these chambers are in communication, respectively, with the casing-chamber 29 by means of ports 107 107'. The recesses 105 105' are also so arranged as to be brought into register with angular passages 108 108', which passages in turn communicate with the chambers 19 19' of the piston. The operation of this form of construction is substantially the same as in the Fig. 8 form. If, for instance, the inlet-steam is passing through the passage 24, it will next enter the duct 104. Then as the recesses 106 106' are successively brought into register with said duct the steam will be free to pass through the angular passage 108 into the chamber 19 of the piston and out of the port 107 of said chamber into the chamber 29. Of course as the segmental raised surfaces 106 106' are brought into register with the duct 104 the inlet-steam of the chamber 19 is cut off, and hence the casing is rotated by the expansive power of the steam already in the chamber 29. The exhaust-steam is of course free to pass from the casing-chamber 29 through the port 107' into chamber 19', thence into the angular passage 108', and thence into a short duct which is normally closed by means of a flap-valve 110', said valve being opened by the pressure of the exhaust-steam and permitting said exhaust-steam to pass into the passage 24'. A similar short duct and a flap-valve 110'' is arranged on the other side to provide a continuous exhaust when the engine is running in the opposite direction.

It will be noticed that the segmental raised surfaces in both the Fig. 8 and Fig. 10 forms are shown as separate segmental blocks fitting in continuous circular recesses and held in place by means of bolts. This is the preferable construction, inasmuch as it provides for readily removing the segmental plates and adjusting others either of greater or less length, so as to cut off the steam for greater or less periods. It will be further noted that in the Fig. 10 construction instead of providing the antifriction-rollers 43 and 43' in the hubs of the casing I merely provide ordinary packings 109 109', of Babbitt metal.

Fig. 12 illustrates a modification of the means for holding the inner edges of the sliding gates in contact with the piston. This modification comprehends the doing away with the feature of introducing steam back of the outer edges of the gates, as in the Fig. 1 construction, and in lieu thereof providing each gate with an outwardly-extending stem 110, which stem passes through the outer end of the chamber for the gate. To the outer end of this stem is secured a cross-bar 111, and to the ends of this cross-bar are pivoted links 112 112. To the inner ends of these links are pivoted the inner ends of springs 113 113, the outer ends of said springs being secured to the rim 46. It is obvious that the tendency of the springs 113 is to exert an inward force on the links 112 and said links in turn an inward force on the cross-bar 111. This will have the effect of forcing the stem 110 inwardly, and consequently holding the inner edge of the gate in contact with the piston. When the casing is carried around such distance as to cause the eccentric portion of the piston to bear on the gate, the pivotal connection formed by the links 112 will allow the outward movement of the cross-bar 111 without strain on or breakage of the springs.

Figs. 13 and 14 represent modifications in the mechanism operated by the governor. In the form of construction illustrated in Figs.

1 to 7, inclusive, the governor mechanism does not act directly on the valve 75 in order to regulate the speed of the engine, but upon interior valves 74 74'. In the modified form illustrated in Figs. 13 and 14 the steam is cut off by the governor mechanism directly at the main valve 75. Both of these modifications contemplate the doing away with entirely of the arms 66 66' and rods and allied mechanism.

Referring particularly to the Fig. 13 form, the valve-operating lever 80 is fast on the valve-stem 78, as in the Fig. 1 to 7 construction, and also the segmental rack 79 is loose on said valve-stem. The segmental rack is formed with a projecting arm 114, which has an upwardly-beveled outer end. One end of a coiled spring 115 is secured to the framework and the opposite end of said spring to the arm 114. The lower end of the depending arm 53 of the governor mechanism has hinged thereto a supplemental rod 116, and this rod is formed on its edge which is adjacent to the end of the arm 114 with a series of teeth 117, any of which are adapted to engage the end of the arm 114 to hold said arm in the horizontal position illustrated in Fig. 13. The lower extremity of supplemental rod 116 is bent at an oblique angle, as indicated at 118. Adapted to bear against this oblique extension is a roller 119, carried at the end of a short arm 120. A spring 121 is connected to rod 53, and the free end of said spring bears against supplemental rod 116, so as to normally hold the toothed edge of said supplemental rod in engagement with the end of arm 114. Another spring 122 is located above the arm 114 and is adapted to limit the upward throw of said arm. The numeral 123 indicates a medially-pivoted lever which carries at one end an antifriction-roller 124. The opposite end of the lever is formed with an elongated slot 125, which slot receives a pin 126, projecting from the rod 116.

In operation when the speed of the engine becomes too great and the rod 53 is forced downwardly by the outflying of the governor-weights 52 the supplemental rod 116 is also caused to move downwardly slightly, so as to cause the oblique extension 118 thereof to ride along the roller 119. As the oblique extension is thus acted on by the roller 119 the supplemental rod is caused to turn on its hinged joint outwardly away from the end of the arm 114, and thereby release the teeth 117 from engagement with the end of arm 114. The moment the arm is thus released the spring 115 will act on said arm and cause the same to move upwardly, and as the arm is fast to the segmental rack 79 and said rack in turn is made fast to the lever 80 by the dog 81, which lever 80 in turn is fast to the valve-stem 78, it is obvious that said valve-stem and its valve are turned. The recesses in the valve are by this movement brought into position to diminish the supply of inlet-steam or to entirely cut off the supply of the steam, in accordance with the extent to which the valve is turned. After the speed of the engine has been decreased and the rod 53 begins to ascend toward its former position the lever 123 is turned on its central pivot and the end of said lever carrying the roller 124 is caused to bear on the arm 114, and thereby force said arm down to the horizontal position shown in Fig. 13. At the same time the oblique extension 118 of the rod 116 rides upwardly against the roller, and the spring 121 is then free to turn the rod 116 on its pivot, so as to throw the lower toothed end thereof toward the end of the horizontal arm 114 in order to bring one of the teeth 119 again in engagement with the end of said arm 114. In the return movement of the arm 114 toward its horizontal position the valve-stem 78 and its valve 75 are of course again turned toward and to their former positions.

In the form illustrated in Fig. 14 the segmental rack 79 is also loose on the valve-stem 78 and the valve-operating arm 80 fast on said valve-stem. The arm 114, however, of the segmental rack is provided with an elongated slot 127. An upwardly-opening hinged leaf 128 is secured to the free end of the arm 114 on the upper edge of said arm, and this hinged leaf projects for a short distance over the slot 127. In this form of construction the supplemental rod 116 is entirely dispensed with and the rod 53 extended downwardly. A lever 129 is pivoted medially to the rod 53, and said lever carries at opposite ends rollers 130 130. The lever 129 is also pivoted, as indicated at 131, to the framework at a point between one of its ends and the pivotal connection with the rod 53. In the operation of this form when the speed of the engine becomes too great and the rod 53 is forced downwardly by the outflying of the governor-weights 52 the lever 129 will be turned on its pivot connection with the rod 53 and the right-hand end of the lever will be thrown into engagement with the leaf 128. This will cause a down movement of the arm 114, and this down movement will permit the right-hand roller 130 of lever 129 to roll by the end of the leaf 128 and pass into the elongated slot 127. The down movement of the arm 114 will cause the valve-stem and its valve to be turned so as to decrease the speed of the engine in the same manner as in the Fig. 13 form. After the speed has thus been decreased the rod 53 will begin to rise, and as the leaf 128 opens upwardly no obstruction is afforded to the upward swinging of the right-hand end of lever 129, so as to assume the position shown in Fig. 14. The spring 115 also acts on arm 114, so as to return said arm to its Fig. 14 position.

It will be apparent that the forms shown in Figs. 13 and 14 are more particularly adapted for the modified forms of construction illustrated in Figs. 8 and 10. The Figs. 13 and 14 constructions, however, could also be used in connection with the principal form of construction illustrated in Figs. 1 to 7, inclusive, or in connection with any form of engine, and in that case the arms 66 66', rods 69 69', and other allied parts would be dispensed with.

Sheet 5 of the drawings illustrates another form of my invention, the modification being represented as applied to a single-acting engine, although said modification is equally applicable to a double-acting engine. The piston in this modified form is indicated by the numeral 18'. The cam projection of said piston is designated by the numeral 131 and is of somewhat different form than the cam projection represented in the several other constructions illustrated. The shaft or axis 17 is provided with the longitudinal channels 24 24', and channel 24 communicates with a passage 132, said passage communicating at its outer end with a chamber 133, extending at an angle therefrom. This chamber in turn has a duct 134 leading therefrom and communicating with the casing-chamber 29. A steam-lead 135 extends from the duct 134 and also communicates with the casing-chamber 29. Pivoted within the chamber 133 is a plate-valve 136, a pin 137 forming the pivot. The lower end of this plate is bifurcated, and the inner furcate part has openings 138 138' therethrough. Extending from the plate-valve is a lug 139, forming a bearing for a pin 140, on which an arm 141 is pivoted. Arm 141 is formed at its lower end with an outwardly-turned projection 142, which is adapted to work through the opening 138 of plate 136. Also pivoted on pin 140 is an arm 143, which is likewise formed at its lower end with an inwardly-extending projection 144, extending into the opening 138'. Another lug 145 extends from the plate-valve 136 above the lug 139, and this lug 145 forms a bearing for a pin 146, on which pin is pivoted an arm 147, said arm having its lower end pivoted to arm 143 at the point 148. Within the longitudinal channel 24 extends a rod 69, similar to the rod of the Fig. 1 form of construction, and this rod 69 connects at its inner end to a link 72. The link has connected to its other end a pitman 149, the opposite end of said pitman in turn being connected with a transverse pin 150, which pin unites the two arms 141 and 147.

Within a suitable recess or opening 151 in the piston is a pivoted arm 152. The lower end of this arm carries an antifriction-roller 153, which is adapted to be acted upon by segments arranged on opposite sides of the piston. The antifriction-roller is adapted at certain periods to ride in segmental recesses 92 92 or 94 94 or to be acted upon by segmental raised surfaces similar to 93 93 or 95 95. (See Figs. 2 and 5.) The upper end of the pivoted lever 152 passes between the furcate parts of the pivoted plate-valve 136. From the longitudinal channel 24' of the shaft or axis 17 extends an exhaust-passage 154, which is prolonged through the piston, so as to communicate with the casing-chamber 29.

It will be understood that the rod 69 in the longitudinal channel 24 at its outer extremity is connected to governor-trip mechanism similar to that shown, for instance, in the Fig. 1 form of construction. In said Fig. 1 form of engine, however, two arms 66 66' are provided. In the present illustration of the modification, however, as the engine shown is but a single-acting engine, and consequently only one rod 69 is employed, only one arm—say arm 66—is therefore provided. It will be obvious, however, that this modified construction is equally applicable to a double-acting engine, and in such case the parts shown on the left of Fig. 15 would be duplicated on the right of said figure, and two rods similar to 69 69' would be provided, one for each longitudinal channel of the shaft, as in the Fig. 1 form, and consequently both arms 66 66' would also be provided for connection to the outer ends of the rods and for operating said rods.

In the operation of the modified form just described when the speed of the engine becomes too great, and consequently the rod 69 is acted upon by the governor-tripping mechanism, the pitman 149 will be actuated so as to turn arm 141 on its pivot and arm 147 on its pivot 146. The turning of arm 141 will be in a direction to draw the lower projection 142 outwardly through the opening 138. The effect of the turning of arm 147 will be to cause said arm to turn arm 143 in a direction to thrust its projection 144 inwardly through the opening 138'. It will also be understood that as the casing 30 is revolved the raised segmental surfaces are brought into engagement with the antifriction-roller 153, which of course will have the effect of turning the lever 152 on its pivot, the turning of said lever in one direction causing the upper end thereof to act against the projection 144, which has been thrust inwardly across the bifurcated portion of the plate-valve, and thereby turn said valve in a direction to close off the duct 134, and consequently cut off the admission of steam into the casing-chamber 29, thereby permitting the engine to continue its rotation by the expansion of the steam already in said casing-chamber. The plate-valve will retain its adjusted position owing to the friction of the parts until said valve is actuated in the opposite direction. The lever 152 will of course continue to be turned by the opposite raised segments; but said turning will have no effect on the valve-plate until the projection 142 is subsequently thrust inwardly across the bifurcated portion of the plate-valve. When the speed of the engine slows down, the pitman 149 is operated upon by the rod 69 in an opposite direction to cause the projection 144 to withdraw and the projection 142 to intersect the bifurcated end of the plate-valve. The turning of the lever 152 by the raised segments opposite to those first referred to will cause said lever to act on the projection 142, and thereby swing the plate-valve to a position to once more open the duct 136, and thereby admit steam to the casing-chamber.

While I have described steam in the foregoing specification as the actuating medium, yet it will be understood that I do not wish to limit myself to that particular agent, inasmuch as any other suitable actuating medium may be employed, such as gas, compressed air, &c.

In case it is desired to use my invention in connection with a threshing-machine or other machine the engine mechanism may of course be connected directly to the boiler of said machine.

What I claim as my invention is—

1. In a rotary engine, the combination, of a shaft or axis, a casing forming an interior chamber, and a piston within the chamber, said piston provided with peripherally-extending cam projection, and one of the latter parts being rotatable, and said piston provided with passages or chambers in communication with other passages, one of said latter passages being adapted to act as an inlet-passage, and the other of said latter passages as an exhaust-passage, and said passages or chambers in the piston being in communication with the casing-chamber, opposite segments formed in the rotatable part, with opposite recesses in the same arc of a circle and continuous with the segments, the segments adapted to close the inlet and exhaust passages or chambers in the piston, and the segmental recesses to open said passages or chambers, the inlet passage or chamber when thus opened permitting the inlet-steam to flow to the casing-chamber to actuate the rotatable part, and said inlet passage or chamber when closed by the segments causing the rotatable part to be revolved solely by the expansion of the steam already in the casing-chamber, slidable gates adapted to work against the edge of the piston, and a valve for regulating the admission of steam to one of the passages or chambers, and for the exhausting of the steam through the other passage or chamber of the piston.

2. In a rotary engine, the combination, of a shaft or axis, a casing forming an interior chamber, a piston within said chamber, said piston provided with a peripherally-extending cam projection, and one of said latter parts being rotatable, and the piston provided with passages or chambers in communication with other passages, one of said latter passages being adapted to act as an inlet-passage, and the other of said latter passages as an exhaust-passage, and said passages or chambers in the piston being in communication with the casing-chamber, sets of opposite segments formed in the rotatable part with opposite recesses for each set in the same arc of a circle with the segments and continuous therewith, pivoted arms for regulating the passages or chambers of the piston which lead into the casing-chamber, the arm for the inlet-opening adapted to be acted upon by the segments of one set so as to turn said arm to a position to have one end uncover the inlet-opening, and its other end to be received in the segmental recesses of the opposite set, and when acted upon by the segments of the other set to turn the arm so as to cause one end to cover the inlet-opening, and its opposite end to be received in the segmental recesses of the opposite set, and the arm for the exhaust-opening being adapted to be acted upon in a similar manner to cover and uncover the exhaust-opening leading from the casing-chamber into the chamber or passage in the piston, slidable gates adapted to bear at their inner edges against the edge of the piston, and a valve for regulating the admission of steam to one of the passages or chambers of the piston, and for the exhaust of the steam through the other passage or chamber of the piston.

3. In a rotary engine, the combination, of a revoluble casing forming an interior piston-chamber, a stationary piston having passages or chambers therein communicating with the chamber of the casing and in communication with other passages, one of said latter passages being adapted to act as an inlet-passage, and the other of said latter passages as an exhaust-passage, a fixed shaft or axis to which the piston is rigidly connected, opposite segments formed in the casing, with opposite recesses in the same arc of a circle as the segments and continuous therewith, the segments adapted to close the inlet and exhaust passages or chambers in the piston, and the segmental recesses to open said passages or chambers, the inlet passage or chamber, when thus opened permitting the inlet-steam to flow to the chamber of the casing to actuate said casing, and said inlet passage or chamber when closed by the segments, causing the casing to be revolved solely by the expansion of the steam already in the piston-chamber, slidable gates adapted at their inner edges to bear against the edge of the piston, and a valve for regulating the admission of steam to one of the passages or chambers of the piston, and for the exhausting of the steam through the other passage or chamber of the piston.

4. In a rotary engine, the combination, of a revoluble casing forming an interior piston-chamber, a stationary piston having passages or chambers therein communicating with the chamber of the casing and in communication with other passages, one of said latter passages being adapted to act as an inlet-passage, and the other of said latter passages as an exhaust-passage, and said piston provided with a peripherally-extending cam projection, a fixed shaft or axis to which the piston is rigidly connected, sets of opposite segments formed in the casing, with opposite recesses for each set in the same arc of a circle with the segments, and continuous therewith, the segments of the respective sets adapted to close the inlet and exhaust chambers in the piston, and the segmental recesses to open said passages or chambers, the inlet passage or chamber when thus opened permitting the inlet-steam to flow to the chamber of the casing to actuate said casing, and when said inlet passage or chamber is closed by the segments causing the casing to be revolved solely by the expansion of the steam already in the casing-chamber, slidable gates adapted at their inner edges to bear against the edge of the piston, and a valve for regulating the admission of steam to one of the passages or chambers of the piston, and for the exhausting of the steam through the other passage or chamber of the piston.

5. In a rotary engine, the combination, of a revoluble casing forming an interior chamber, a stationary piston having passages or chambers therein communicating with the chamber of the casing, and in communication with other passages, one of said latter passages being adapted to act as an inlet-passage, and the other of said latter passages as an exhaust-passage, and said piston provided with recesses and with a peripherally-extending cam projection, a fixed shaft or axis to which the piston is rigidly connected, sets of opposite segments formed in the casing, with opposite recesses for each set, said recesses being in the same arc of a circle with the segments, and continuous therewith, arms pivoted in the recesses of the piston, said arms adapted for regulating the ducts leading from the passages or chambers of the piston to the casing-chamber, the arm for the inlet-opening adapted to be acted upon by the segments of one set, so as to turn said arm to a position to have one end thereof uncover the inlet-opening and its opposite end to be received in the segmental recesses of the opposite set, and when acted upon by the segments of the other set, to turn the arm so as to cause one end to cover the inlet-opening, and its opposite end to be received in the segmental recesses of the opposite set, and the arm for the exhaust-opening adapted to be acted upon in a similar manner to cover and uncover the exhaust-duct, slidable gates adapted at their inner edges to bear against the edge of a pistion, and a valve for regulating the admission of steam to one of the passages or chambers of the piston, and for the exhausting of the steam through the other passage or chamber of the piston.

6. In a rotary engine, the combination, of a revoluble casing forming an interior chamber, said casing provided with opposite segments and with opposite recesses which are in the same arc of a circle as the segments and continuous therewith, a piston within the chamber of the casing, said piston having passages or chambers therein communicating with the segments and with the segmental recesses, and also having other passages therein communicating with said segments and recesses and with the chamber of the casing, the last-named passages also communicating with other passages, one of said latter passages being adapted to act as an inlet, and the other of said latter passages as an exhaust passage, and said piston further provided with a peripherally-extending cam projection, a fixed shaft or axis to which the piston is rigidly connected, slidable gates adapted at their inner edges to bear against the edge of the piston, and a valve for regulating the admission of steam to one of the passages or chambers of the piston, and for the exhausting of the steam through another passage or chamber of the piston.

7. In a rotary engine, the combination, of a revoluble casing forming an interior chamber, said casing provided with sets of opposite segments and opposite recesses, the recesses being in the same arc of a circle as the segments, and continuous with said segments, a piston within the chamber of the casing, said piston having passages or chambers therein, one passage or chamber communicating with the segments and recesses of one set, and the other passage or chamber with the segments and recesses of the other set, and said piston also having other passages therein communicating each with one of the passages or recesses in the piston and with the chamber of the casing, the last-named passages also communicating with other passages, one of said latter passages being adapted to act as an inlet, and the other of said latter passages as an exhaust passage and said piston further provided with a peripherally-extending cam projection, a fixed shaft or axis to which the piston is rigidly connected, slidable gates adapted at their inner edges to bear against the inner edge of the piston, and a valve for regulating the admission of steam to one of the passages or chambers of the piston, and for the exhausting of the steam through another passage or chamber of the piston.

8. In a rotary engine, the combination, of a revoluble casing forming an interior chamber, a piston within the chamber of the casing, said piston having passages or chambers in communication with the chamber of the casing, a fixed shaft or axis to which the piston is rigidly connected and said shaft or axis provided with longitudinal passages extending to and communicating with the passages or chambers in the piston, a valve for regulating the admission of steam to one of the longitudinal passages of the shaft or axis, and for exhausting the steam through the other longitudinal passage of said shaft or axis, rods within the longitudinal passages of the shaft or axis, means for operating said rods, valves within the passages or chambers in the piston, and adapted for regulating the ports or ducts leading from said passages or chambers in the piston to the chamber of the casing, and connections between the rods and said valves.

9. In a rotary engine, the combination, of a revoluble casing forming an interior chamber, a piston within the chamber, said piston having passages or chambers in communication with the chamber of the casing, a fixed shaft or axis to which the piston is rigidly connected, said shaft or axis provided with longitudinal passages extending to and communicating with the passages or chambers in the piston, a main valve for regulating the admission of steam to one of the longitudinal passages of the shaft or axis, and for exhausting the steam through the other longitudinal passage of said shaft or axis, rods within the longitudinal passages of the shaft or axis, valves within the passages or chambers in the piston, and adapted for regulating the ports or ducts leading from said passages or chambers in the piston to the chamber of the casing, connections between the rods and said valves, arms connected to the outer ends of the rods, a shaft carrying at one end a cam which is located between the arms, a connection between the valve-stem and the shaft carrying the cam, a bell-crank lever having its horizontal arm provided with an elongated slot and also having detachable connections with the arms, one of said arms being thrown out of engagement with the bell-crank lever when the valve-stem is turned in either direction, an upwardly-opening hinged leaf secured to the horizontal arm of the bell-crank lever, and extending for a distance over the end of the slot, and governor mechanism operating on the bell-crank lever so as to turn the same when the speed of the engine becomes too great, and thereby move the arm to which it is connected so as to operate on one of the valves in the passage or chamber of the piston, in order to slow up the speed of the engine.

10. In a rotary engine, the combination, of a revoluble casing forming an interior chamber, a piston within the chamber, said piston having passages or chambers in communication with the chamber of the casing, a fixed shaft or axis to which the piston is rigidly connected, said shaft or axis provided with longitudinal passages extending to and communicating with the passages or chambers in the piston, a main valve for regulating the admission of steam to one of the longitudinal passages of the shaft or axis, and for exhausting the steam through the other longitudinal passage of said shaft or axis, rods within the longitudinal passages of the shaft or axis, valves within the passages or chambers in the piston, and adapted for regulating the ports or ducts leading from said passages or chambers in the piston to the chamber of the casing, connections between the rods and said valves, arms connected to the outer ends of the rods, a shaft carrying at one end a cam which is located between the arms, a connection between the valve-stem of the main valve and the shaft carrying the cam, a bell-crank lever having detachable connections with the arms, one of said arms being thrown out of engagement with the bell-crank lever, when the valve-stem is turned in either direction, governor mechanism, a rod connected to said governor mechanism, and adapted to be moved downwardly and upwardly thereby as the speed of the engine is increased or decreased, and a lever located above the horizontal member of the bell-crank lever, and pivoted at a point intermediate of its ends, and also pivoted at a point intermediate of its ends to the rod of the governor mechanism.

11. In a rotary engine, the combination, of a casing forming a chamber, a piston therein, said piston provided with a peripherally-extending cam projection, a sliding gate adapted to bear at its inner edge against the edge of the piston, a stem projecting from the gate, and provided at its outer end with a cross-bar, links pivoted to said cross-bar, and springs pivoted at their inner ends to the links.

12. The combination, of a valve, a valve-operating lever fast on the stem of the valve, a segmental rack loose on the valve-stem, said rack formed or provided with a projecting arm, a spring acting on the arm to normally turn said arm on the valve-stem, a dog pivoted to the valve-operating lever and engaging the segmental rack, governor mechanism, a rod adapted to be acted upon by the governor mechanism so as to be caused to descend on an increase of speed of the engine and to ascend on a decrease of speed of the engine, a pivoted lever having a pivotal connection also with the rod, said rod on its descent adapted to cause a turning of the arm so as to turn the valve in a direction to cut off the supply of the actuating medium, and when the speed of the engine decreases and the rod ascends, the lever pivoted to the rod adapted to cause the arm to turn so as to turn the valve and gradually bring the engine to a normal or faster speed.

13. The combination, of a valve, a valve-operating lever fast on the stem of said valve, a segmental rack loose on the valve-stem, said rack formed or provided with a projecting arm, a spring acting on said arm to normally throw the same upwardly, a dog pivoted to the valve-operating lever and engaging the segmental rack, governor mechanism, a rod, depending therefrom and adapted to be caused to descend on an increase of speed on the engine, and to ascend on a decrease of speed of the engine, a supplemental rod pivoted to the first-named rod, said supplemental rod provided with teeth on its edge adjacent to the end of the arm, and also having its lower extremity formed with an oblique extension, a spring secured to the governor rod and bearing at its free end against the supplemental rod, a roller adapted to bear against the oblique extension of the supplemental rod, and a lever pivoted at a point intermediate of its ends, and also having a pivotal connection with the supplemental rod.

14. In a rotary engine, the combination, of a revoluble casing forming an inner chamber, a stationary piston within said chamber and having a cam projection extending therefrom, and said piston provided with passages or chambers in communication with other passages, one of said latter passages being adapted to act as an inlet-passage, and the other of said latter passages as an exhaust-passage, and said passages or chambers in the piston being in communication with the casing-chamber; a longitudinal shaft for the piston, a pivoted plate-valve within one of the piston passages or chambers and adapted to control the admission of steam to the casing-chamber, arms pivoted to the plate-valve and having their lower ends formed with projections adapted to register with openings in the end of the plate-valve, one of said arms being of greater length than the other, another short arm pivoted at a medial point to the plate-valve, and also connected at its upper end to the long arm and at its lower end to the other short arm, governor-trip mechanism, mechanism connected to the connected long and short arms and adapted to be acted upon by the governor-trip mechanism so as to alternately throw the arms having the projections inwardly and outwardly through the openings of the plate-valve, a lever pivoted in the piston, means for actuating said lever so as to cause the same to act on the projections of the arms, and gates adapted to have their inner edges held yieldingly against the edge of the piston.

In testimony whereof. I affix my signature in presence of two witnesses.

JOHN P. DORAN.

Witnesses:
W. C. KADOW,
E. S. SCHMITZ.

Correction in Letters Patent No. 624,462.

It is hereby certified that the name of the patentee in Letters Patent No. 624,462, granted May 9, 1899, for an improvement in "Rotary Engines," was erroneously written and printed "John P. Doran," whereas said name should have been written and printed *John P. Dorau;* and that the said Letters Patent should be read with this correction therein that the same may conform to the record of the case in the Patent Office.

Signed, countersigned, and sealed this 23d day of May, A. D., 1899.

[SEAL.]
                                                WEBSTER DAVIS,
*Assistant Secretary of the Interior.*

Countersigned:
   C. H. DUELL,
      *Commissioner of Patents.*